Patented Mar. 13, 1923.

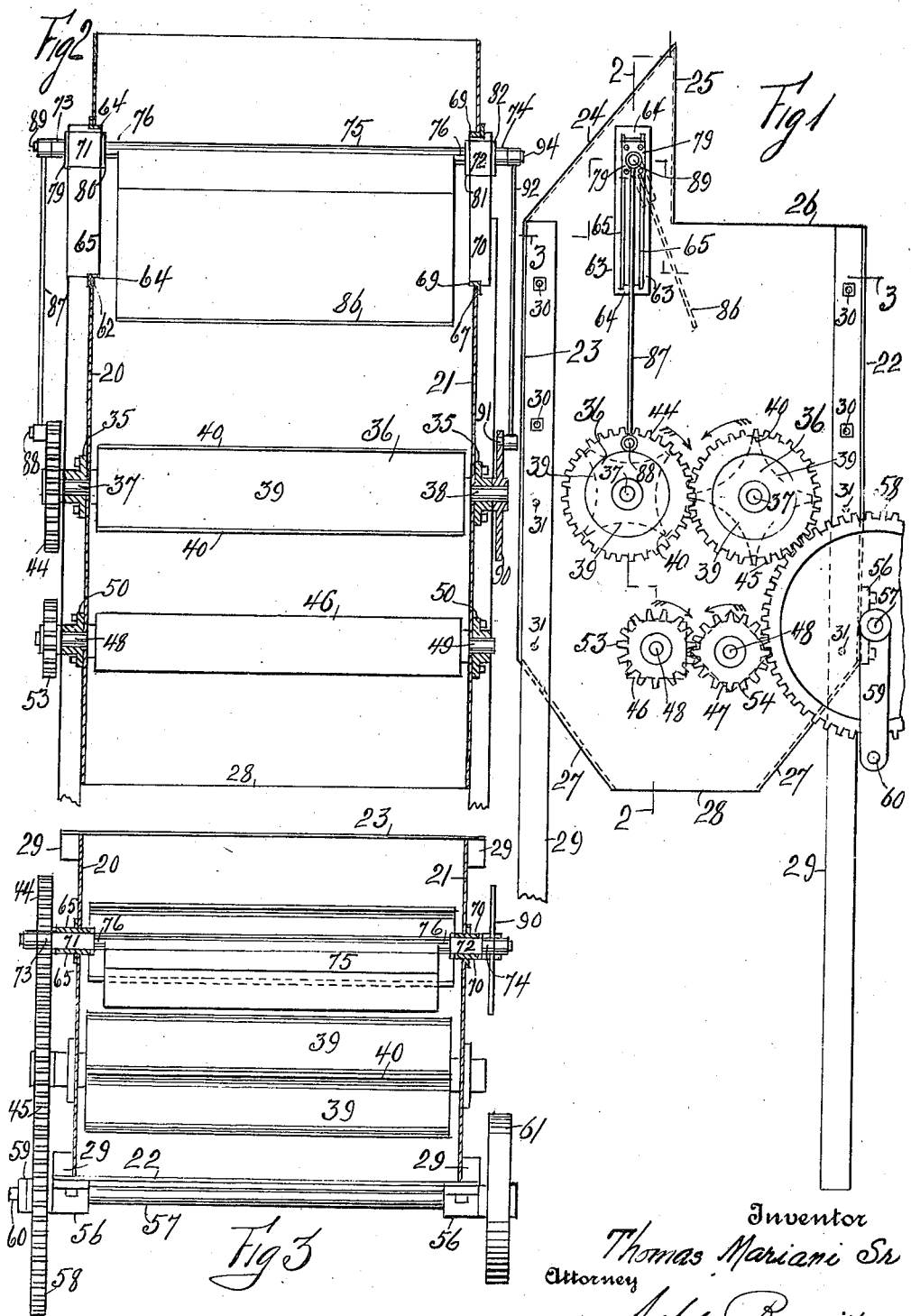

1,447,995

UNITED STATES PATENT OFFICE.

THOMAS MARIANI, SR., OF BAYONNE, NEW JERSEY, ASSIGNOR OF ONE-HALF TO PETER PARIS, OF BAYONNE, NEW JERSEY.

GRAPE CRUSHER.

Application filed May 24, 1919. Serial No. 299,536.

*To all whom it may concern:*

Be it known that I, THOMAS MARIANI, Sr., citizen of the United States, and resident of Bayonne, in the county of Hudson and State of New Jersey, have invented certain new and useful Improvements in a Grape Crusher, of which the following is a specification.

This invention relates to improvements in a crusher, and is particularly adapted to be used as a grape crusher.

In the accompanying drawings Fig. 1 represents a front elevation of a grape crusher exemplifying the invention; Fig. 2 shows a section of Fig. 1 on the broken line 2, 2 and Fig. 3 is a section on the line 3, 3 of Fig. 1.

The crusher comprises a hopper with the front wall 20, the rear wall 21, and the side walls 22 and 23 which extend beyond the walls 20 and 21. The top of the hopper comprises the inclined wall 24, the vertical wall 25 and a charging opening 26. The bottom of the hopper comprises the hopper walls 27 and the discharge opening 28. Supporting legs 29 are bolted to the walls 20 and 21 by means of the bolts 30.

Two extra pairs of bolt holes 31 are formed in the walls 20 and 21 to enable the legs 29 to be bolted to the hopper in a lower position, to normally maintain the hopper at a higher level.

To the walls 20 and 21 are fastened journal boxes 35 over corresponding openings thereof. Collecting and crushing rolls 36 are located in the hopper and have extending from their ends the journal pins 37 and 38 that extend through the said openings in the walls 20 and 21 and are supported in the journal boxes 35. The rolls 36 have each four concaved faces 39 and four apexes 40 and are located so that when they are turned, the apex of one roll will coact with a concaved face of the other roll to pull down material, such as grapes, that is located above and upon them. The journal pins have fastened thereto the pair of spur gears 44 and 45 that mesh with each other. Below the rolls 36 are located the crushing rolls 46 and 47 square in cross section, which have extending therefrom the journal pins 48 and 49. Journal brackets 50 are fastened to the walls 20 and 21. The pins 48 and 49 extend through openings in the walls 20 and 21 and are supported in said journal brackets 50. The rolls 46 and 47 are located with respect to each other so that the corner edge of one will coact with the adjoining face of the other, to crush the material or grapes as they pass between them. Spur gears 53 and 54 are fastened to the pins 48. Journal brackets 56 are fastened to the side wall 22 of the hopper and have journaled therein the driving shaft 57. On one end of the shaft 57 is fastened the spur gear 58 which meshes with the spur gears 45 and 47. An operating arm 59 with the handle 60 is fastened to one end of the shaft 57 and a balance wheel 61 is fastened to the other end of the said shaft. An opening 62 is formed in the front wall 20 and has fitted therein and fastened to said wall 20 the cross head guide comprising the vertical angle portions 63 and the horizontal angle portions 64. Vertical guide plates 65 extend from the angle portions 63. An opening 67 is formed in the rear wall 21 and has fitted therein and fastened to said wall 21, the cross head guide comprising vertical angle portions similar to 63 and the horizontal angle portions 69. Vertical guide plates 70 similar to 65 extend from the latter vertical angle portions.

Cross heads 71 and 72 rectangular in cross section are respectively guided between the guide plates 65 and 70. The cross head 71 has extending from the outside face thereof the lug 73, and the cross head 72 has extending from the outside face thereof the lug 74. An apron 75 inclined to a vertical plane has lugs 76, which connect with the cross heads 71 and 72. Plates 79 and 80 are fastened to the opposite faces of the cross head 71 and bear against the opposite edges of the guide plates 65. Similar plates 81 and 82 are fastened to the opposite faces of the cross head 72 and bear against the opposite edges of the guide plates 70. A pusher plate 86 inclined to a vertical plane and to the longitudinal axis of the hopper extends from the apron 75. A connecting rod 87 has one end supported on a pin 88 extending from the spur gear 44 and its other end is supported on a pin 89 extending from the lug 73. The pin 38 has fastened thereto the disc wheel 90 which carries the pin 91. A connecting rod 92 has one end supported on the pin 91 and its other end is supported on a pin 94 extending from the lug 74.

To use the crusher the material, like grapes, to be crushed is charged into the hopper through the charging opening 26 and the arm 59 is turned by means of the handle 60. By this means the driving shaft 57 turns and therewith rotation is imparted to the spur gear 58. The gear 58 turns the gears 45 and 54, which in turn respectively turn the gears 44 and 53. By this means the rolls 36 and 46 are turned in the directions indicated by their accompanying arrow. With the rotations of the spur gear 44 the inclined pusher plate 86 is reciprocated in a direction inclined to the plane of its surface and the grapes or other material are pushed down to the rolls 44 and 45. The latter pull down the grapes and partially crushes them. Then the grapes drop to the rolls 46 when they are crushed, and they are finally discharged through the discharge opening 28.

The pusher plate 86 on account of its inclination forces down the grapes at its lower edge and on the area of its lower face.

Having described my invention what I desire to secure by Letters Patent and claim is:—

1. In a crusher of the character described, the combination of a hopper having a charging opening and a discharging opening, a pair of collecting and crushing rolls journaled in the hopper, a pusher plate in the hopper with its face inclined to the longitudinal axis thereof, means to simultaneously rotate the rolls and reciprocate the pusher plate, the direction of the reciprocations of the pusher plate inclined to the surface thereof.

2. In a crusher of the character described the combination of a hopper having a charging opening and a discharging opening, a pair of collecting rolls journaled in the hopper, said rolls having concave faces terminating in apexes, the apexes of one roll coacting with the concave faces of the other roll, a pair of crushing rolls square in cross section below the collecting rolls and located with respect to each other so that the corner edge of one will coact with a flat face of the other and means to simultaneously rotate all the rolls.

Signed at Bayonne in the county of Hudson and State of New Jersey this 5th day of May A. D. 1919.

THOMAS MARIANI, Sr.